United States Patent
Sato

(10) Patent No.: US 9,219,695 B2
(45) Date of Patent: Dec. 22, 2015

(54) SWITCH, INFORMATION PROCESSING APPARATUS, AND COMMUNICATION CONTROL METHOD

(71) Applicant: Fujitsu Limited, Kawasaki-shi (JP)

(72) Inventor: Mitsuru Sato, Paderborn (DE)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 13/721,127

(22) Filed: Dec. 20, 2012

(65) Prior Publication Data

US 2013/0259053 A1    Oct. 3, 2013

(30) Foreign Application Priority Data

Mar. 29, 2012  (JP) .................. 2012-077827

(51) Int. Cl.
*H04L 12/933* (2013.01)
*G06F 3/00* (2006.01)
*H04L 12/947* (2013.01)
*H04L 12/935* (2013.01)

(52) U.S. Cl.
CPC ......... *H04L 49/15* (2013.01); *G06F 3/00* (2013.01); *H04L 49/25* (2013.01); *H04L 49/3009* (2013.01)

(58) Field of Classification Search
None
See application file for complete search history.

(56) References Cited

U.S. PATENT DOCUMENTS

| 6,512,744 B1* | 1/2003 | Hughes et al. ............... 370/232 |
|---|---|---|
| 6,621,818 B1* | 9/2003 | Szczepanek et al. ......... 370/389 |
| 7,102,996 B1* | 9/2006 | Amdahl et al. ............... 370/230 |
| 2001/0044842 A1* | 11/2001 | Kawakami .................... 709/223 |
| 2006/0206655 A1* | 9/2006 | Chappell et al. .............. 710/315 |
| 2006/0242354 A1* | 10/2006 | Johnsen et al. ............... 710/316 |
| 2008/0071927 A1* | 3/2008 | Lee ............................... 709/245 |
| 2008/0112414 A1* | 5/2008 | Beak ............................. 370/392 |
| 2009/0144403 A1* | 6/2009 | Sajassi et al. ................. 709/223 |
| 2009/0296740 A1* | 12/2009 | Wagh et al. ................... 370/475 |
| 2010/0082874 A1 | 4/2010 | Baba et al. |
| 2010/0180062 A1* | 7/2010 | Hidaka et al. ................ 710/314 |
| 2011/0096781 A1 | 4/2011 | Aybay |
| 2011/0110306 A1* | 5/2011 | Yajima ......................... 370/328 |
| 2014/0006679 A1* | 1/2014 | Eguchi et al. ................. 710/316 |
| 2014/0016648 A1* | 1/2014 | Hidaka ......................... 370/400 |

FOREIGN PATENT DOCUMENTS

| JP | 2010-079816 A | 4/2010 |
|---|---|---|
| WO | 2011-141963 A1 | 11/2011 |
| WO | 2012-086068 A1 | 6/2012 |

OTHER PUBLICATIONS

Japanese Office Action mailed Oct. 27, 2015 for corresponding Japanese Patent Application No. 2012-077827, with Partial English Translation, 7 pages.

* cited by examiner

*Primary Examiner* — Dung B Huynh
(74) *Attorney, Agent, or Firm* — Fujitsu Patent Center

(57) ABSTRACT

A PCIe switch stores therein a first identifier used by a CPU to identify a device, a second identifier that is a common identifier to identify the device in a network formed among a plurality of switches that connect the CPU to the device, and a destination of an access request to the device in an associated manner. When having received an access request from the CPU, the PCIe switch identifies a second identifier and a destination that are associated with a first identifier included in the access request. After that, the PCIe switch adds the identified second identifier to the access request, and transmits the access request with the second identifier added to the identified destination.

5 Claims, 18 Drawing Sheets

FIG.3

| VALID | HOST NUMBER | PCIID | LOGICAL ADDRESS RANGE |
|---|---|---|---|
| 1 | 1 | 0x0011 | 0x1200 to 0x3300 |
| 1 | 1 | 0x21 | 0x5200 to 0x5500 |
| ... | ... | ... | ... |

FIG.4

| VALID | HOST NUMBER | PCIID | INTERNAL NETWORK ID |
|---|---|---|---|
| 1 | 1 | 0x0011 | 01234567 |
| 1 | 1 | 0x0012 | 01234568 |
| ... | ... | ... | ... |
| 0 | — | — | — |

FIG.5

| VALID | INTERNAL NETWORK ID | PORT NUMBER |
|---|---|---|
| 1 | 01234567 | 0 |
| 1 | 01234568 | 1 |
| ... | ... | ... |
| 0 | — | — |

FIG.14

| VALID | HOST NUMBER | PCI ID | INTERNAL NETWORK ID |
|---|---|---|---|
| 1 | 0 | 1 | 6 |
| 1 | 0 | 2 | 7 |
| 1 | 0 | 3 | 8 |
| 1 | 0 | 4 | 9 |

FIG.15

| PCIe SWITCH (A) | | | PCIe SWITCH (B) | | | PCIe SWITCH (C) | | | PCIe SWITCH (D) | | | PCIe SWITCH (E) | | |
|---|---|---|---|---|---|---|---|---|---|---|---|---|---|---|
| VALID | INTERNAL NETWORK ID | PORT NUMBER | VALID | INTERNAL NETWORK ID | PORT NUMBER | VALID | INTERNAL NETWORK ID | PORT NUMBER | VALID | INTERNAL NETWORK ID | PORT NUMBER | VALID | INTERNAL NETWORK ID | PORT NUMBER |
| 1 | 0 | 0 | 1 | 0 | 0 | 1 | 0 | 0 | 1 | 0 | 0 | 1 | 0 | 0 |
| 1 | 6 | 1 | 1 | 6 | 1 | 1 | 6 | 1 | 1 | 6 | 3 | 1 | 6 | 2 |
| 1 | 7 | 1 | 1 | 7 | 1 | 1 | 7 | 1 | 1 | 7 | 4 | 1 | 7 | 2 |
| 1 | 8 | 2 | 1 | 8 | 2 | 1 | 8 | 2 | 1 | 8 | 2 | 1 | 8 | 3 |
| 1 | 9 | 2 | 1 | 9 | 2 | 1 | 9 | 2 | 1 | 9 | 2 | 1 | 9 | 4 |

FIG.18

| PCIe SWITCH (A) | | PCIe SWITCH (B) | | | PCIe SWITCH (C) | | | PCIe SWITCH (D) | | | PCIe SWITCH (E) | | |
|---|---|---|---|---|---|---|---|---|---|---|---|---|---|
| VALID | INTERNAL NETWORK ID | PORT NUMBER | VALID | INTERNAL NETWORK ID | PORT NUMBER | VALID | INTERNAL NETWORK ID | PORT NUMBER | VALID | INTERNAL NETWORK ID | PORT NUMBER | VALID | INTERNAL NETWORK ID | PORT NUMBER |
| 1 | 0 | 0 | 1 | 0 | 0 | 1 | 0 | 0 | 1 | 0 | 0 | 1 | 0 | 2 |
| 1 | 6 | 1 | 1 | 6 | 1 | 1 | 6 | 1 | 1 | 6 | 3 | 1 | 6 | 2 |
| 1 | 7 | 1 | 1 | 7 | 1 | 1 | 7 | 1 | 1 | 7 | 4 | 1 | 7 | 2 |
| 1 | 8 | 2 | 1 | 8 | 1 | 1 | 8 | 1 | 1 | 8 | 2 | 1 | 8 | 3 |
| 1 | 9 | 2 | 1 | 9 | 1 | 1 | 9 | 1 | 1 | 9 | 2 | 1 | 9 | 4 |

UPDATED

SWITCH, INFORMATION PROCESSING APPARATUS, AND COMMUNICATION CONTROL METHOD

CROSS-REFERENCE TO RELATED APPLICATION

This application is based upon and claims the benefit of priority of the prior Japanese Patent Application No. 2012-077827, filed on Mar. 29, 2012, the entire contents of which are incorporated herein by reference.

FIELD

The embodiments discussed herein are related to a switch, an information processing apparatus, and a communication control method.

BACKGROUND

Demand for high-performance input and output has been increased with the development of a sophisticated computer, and a high-speed input-output interface, such as PCI Express (hereinafter, may be referred to as "PCIe"), has been used instead of PCI (Peripheral Component Interconnect).

The PCI and the PCIe are standards for connecting a central processing unit (CPU) to an input-output device inside a computer. The PCI directly connects the CPU to the input-output device in the form of a bus structure. Unlike the PCI, the PCIe connects the CPU to the input-output device in the form of a star structure in which a PCIe switch is installed between the CPU and the input-output device. That is, the CPU is connected to the input-output device on a one-on-one basis, and, when the connection between the CPU and the input-output device is branched, it is branched via the PCIe switch.

Such a PCIe switch sets a virtual bus therein, and provides a logic image in which the CPU is connected to each input-output device by the virtual bus. Consequently, the CPU can treat the PCIe the same as the PCI without being aware of a difference in configuration.

In recent years, a multistage configuration in which one PCIe switch is connected to another PCIe switch is used as a technique to add an input-output device to be connected to a computer using the PCIe. That is, a plurality of PCIe switches are connected in a hierarchical structure by connecting one PCIe switch to under another PCIe switch, thereby the number of input-output devices connected to one CPU can be increased.

Patent document 1: Japanese Laid-open Patent Publication No. 2010-079816

However, there is a problem that when the plurality of PCIe switches are connected, a method for connection between the PCIe switches is limited. Incidentally, this problem is not confined to the PCIe switch, and the same holds true for other switches having the same function as the PCIe switch.

For example, even when the plurality of PCIe switches are connected in a multistage configuration, there is a limit to connect a CPU to input-output devices via the PCIe switches in a tree structure. Namely, it is not possible to permit a loop structure which arises when the plurality of PCIe switches are connected. Therefore, duplicate connection is disabled so as to avoid the loop structure. Furthermore, the PCIe switches are connected in the multistage configuration, so redundant paths are made in order to respond to a PCIe switch failure; however, disablement of the loop structure and the redundant paths are achieved together with the maintenance of the tree structure, and therefore the management of the PCIe switches becomes complex.

SUMMARY

According to an aspect of the embodiments, a switch includes: a storage unit that stores therein a first identifier used by a processor to identify a device, a second identifier that is a common identifier to identify the device in a network formed among a plurality of switches that connect the processor to the device, and a destination of an access request to the device in an associated manner; an identifying unit that identifies, when the switch has received an access request from the processor, a second identifier and a destination that are associated with a first identifier included in the access request from the storage unit; and a transmission control unit that adds the second identifier identified by the identifying unit to the access request, and transmits the access request with the second identifier to the destination identified by the identifying unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a PCI-ID conversion table;

FIG. 4 is a diagram illustrating an example of information stored in an internal-network-ID conversion table;

FIG. 5 is a diagram illustrating an example of information stored in a path table;

FIG. 11 is viewed from the CPU;

FIG. 11 is viewed from a related technology;

FIG. 14 is a diagram illustrating an example of an internal-network-ID conversion table held in a PCIe switch (A);

FIG. 15 is a diagram illustrating an example of respective path tables held in PCIe switches;

FIG. 18 is a diagram illustrating an example of updated tables;

DESCRIPTION OF EMBODIMENTS

Preferred embodiments will be explained with reference to accompanying drawings. Incidentally, the present invention is not limited to the embodiments.

[a] First Embodiment

Overall Configuration

Figure 1:
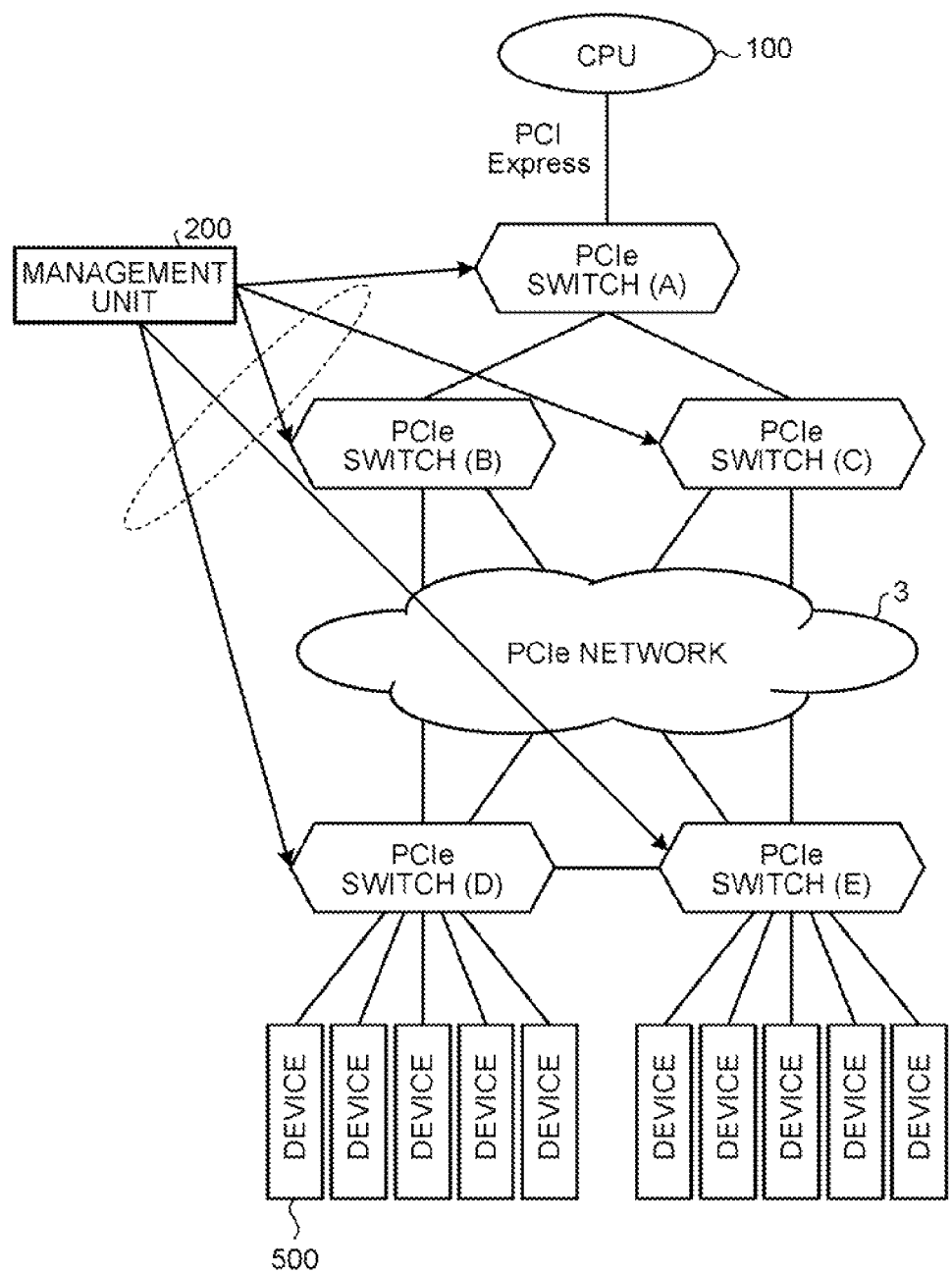
FIG. 1 is a diagram illustrating an overall configuration example of an information processing apparatus according to a first embodiment.

FIG. 1 is a diagram illustrating an overall configuration example of an information processing apparatus according to a first embodiment. As illustrated in FIG. 1, the information processing apparatus includes a central processing unit (CPU) 100, PCI Express switches (A) to (E), a management unit 200, and at least one device 500. Incidentally, the PCI Express switches (hereinafter, referred to as "PCIe switches") and the management unit 200 can be either placed outside the information processing apparatus or built into the information processing apparatus.

The CPU 100 is a processing unit that is connected to the PCIe switch (A) via PCI Express, and transmits various access requests to the device 500 and receives a result. For example, the CPU 100 transmits a data write request to the device 500, and receives a write result.

The PCIe switches (A) to (E) are switches connecting between the CPU 100 and the device 500, and form a PCIe network 3 in which the switches are connected via PCI Express. The management unit 200 is a processing unit that updates path information, etc. held in each PCIe switch, and manages the PCIe network 3. The device 500 is an input-output device (hereinafter, may be referred to as an "I/O device"), and accepts access from the CPU 100.

Under such conditions, each of the PCIe switches includes a storage unit. The storage unit stores therein a PCI ID that the CPU 100 uses to identify the device 500, an internal network ID identifying the device 500 which is a common ID in the PCIe network 3, and a destination of a request for access to the device 500 in an associated manner. Upon receipt of an access request from the CPU 100, the PCIe switch identifies an internal network ID and a destination which are associated with a PCI ID included in the access request from the storage unit. After that, the PCIe switch adds the identified internal network ID to the access request, and transmits the access request to the identified destination.

In this manner, each PCIe switch converts a PCI ID that the CPU 100 uses into an internal network ID managed in the PCIe switch, and transfers an access request to the device 500 using a new header including the ID. This allows for transfer by a higher layer, and it is possible to relax limits on connections among the PCIe switches.

Configuration of PCIe Switch

Figure 2:
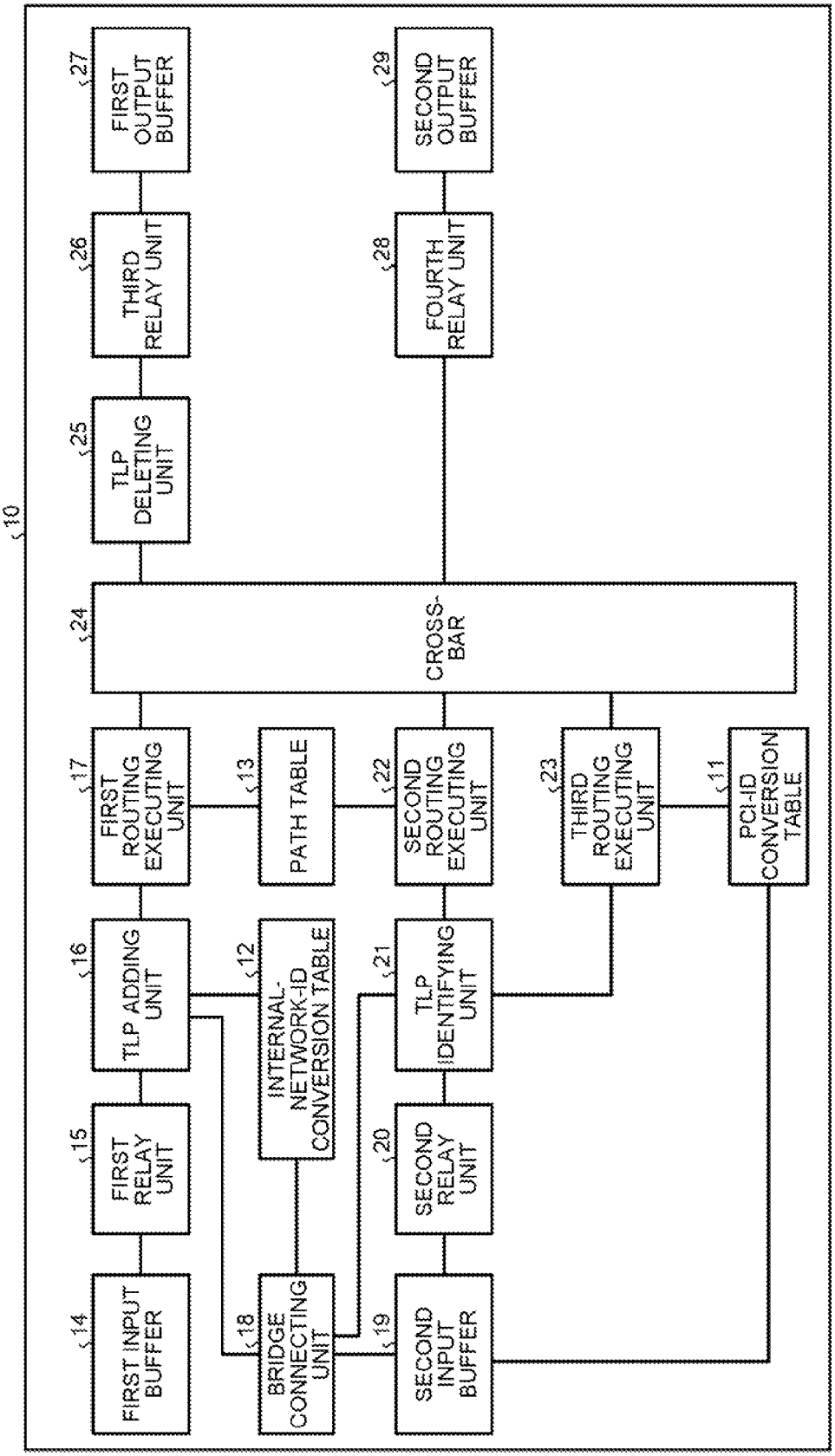
FIG. 2 is a block diagram illustrating a configuration of a PCIe switch.

FIG. 2 is a block diagram illustrating a configuration of the PCIe switch. Incidentally, the PCIe switches illustrated in FIG. 1 have the same configuration, so the PCIe switches are collectively referred to as a PCIe switch 10 here.

As illustrated in FIG. 2, the PCIe switch 10 includes a PCI-ID conversion table 11, an internal-network-ID conversion table 12, a path table 13, a first input buffer 14, a first relay unit 15, a TLP adding unit 16, a first routing executing unit 17, and a bridge connecting unit 18. Furthermore, the PCIe switch 10 includes a second input buffer 19, a second relay unit 20, a TLP identifying unit 21, a second routing executing unit 22, a third routing executing unit 23, and a crossbar 24. Moreover, the PCIe switch 10 includes a TLP deleting unit 25, a third relay unit 26, a first output buffer 27, a fourth relay unit 28, and a second output buffer 29.

Incidentally, the processing units are, for example, an electronic circuit such as a CPU or an integrated circuit such as an FPGA (Field-Programmable Gate Array). Furthermore, the processing units are a processing unit executed by a CPU or the like. The tables are held in, for example, a semiconductor memory device. The processing units illustrated in FIG. 2 are just an example, and the PCIe switch 10 can include, for example, a network interface card or the like.

The PCI-ID conversion table 11 is a storage unit that stores therein information on conversion from a logical address assigned to the device 500 into a PCI ID used by the CPU 100 to logically identify a device. FIG. 3 is a diagram illustrating an example of the information stored in the PCI-ID conversion table. As illustrated in FIG. 3, the PCI-ID conversion table 11 stores therein "Valid", a "host number", a "PCI ID", and a "logical address range" in an associated manner.

The "Valid" stored in the PCI-ID conversion table 11 is information indicating whether entry is valid or not: 1 is set when the entry is valid, and 0 is set when the entry is invalid. The "host number" is an identifier identifying the CPU 100. The "PCI ID" is an identifier used by the CPU 100 to logically identify a device. The "logical address range" is a range of logical addresses assigned to the PCI ID.

To explain one example in FIG. 3, it indicates that a range of logical addresses "0x1200 to 0x3300" that the CPU 100 accesses corresponds with a device with a PCI ID "0x0011", which is to be connected to the CPU 100 with a host number "1" and is a currently valid device. Incidentally, the information stored in the PCI-ID conversion table 11 is updated by the management unit 200 and the like. Furthermore, the information illustrated in FIG. 3 is just an example, and items of the PCI-ID conversion table 11 are not limited to those illustrated in FIG. 3; for example, information on a device name can be further stored in the PCI-ID conversion table 11 to be associated with the information illustrated in FIG. 3.

The internal-network-ID conversion table 12 is a storage unit that stores therein information on conversion from a PCI ID into a common identifier identifying the device 500 in the PCIe network 3 formed among the plurality of PCIe switches. FIG. 4 is a diagram illustrating an example of the information stored in the internal-network-ID conversion table. As illustrated in FIG. 4, the internal-network-ID conversion table 12 stores therein "Valid", a "host number", a "PCI ID", and an "internal network ID" in an associated manner.

The "Valid" stored in the internal-network-ID conversion table 12 is information indicating whether entry is valid or not; 1 is set when the entry is valid, and 0 is set when the entry is invalid. The "host number" is an identifier identifying the CPU 100. The "PCI ID" is an identifier used by the CPU 100 to logically identify a device. The "internal network ID" is a common identifier identifying the device 500 in the PCIe network 3 formed among the plurality of PCIe switches.

To explain one example in FIG. 4, an access request output from the CPU 100 with host number "1" to a device with PCI ID "0x0011" indicates that the PCI ID "0x0011" is converted into internal network ID "01234567". Incidentally, the information stored in the internal-network-ID conversion table 12 is updated by the management unit 200 and the like. Furthermore, the information illustrated in FIG. 4 is just an example, and items of the internal-network-ID conversion table 12 are not limited to those illustrated in FIG. 4; for example, information on a device name can be further stored in the internal-network-ID conversion table 12 to be associated with the information illustrated in FIG. 4.

The path table 13 is a storage unit that stores therein a destination of a packet input from the CPU 100 or another PCIe switch. FIG. 5 is a diagram illustrating an example of the information stored in the path table. As illustrated in FIG. 5, the path table 13 stores therein "Valid", an "internal network ID", and a "port number" in an associated manner.

The "Valid" stored in the path table 13 is information indicating whether entry is valid or not; 1 is set when the entry is valid, and 0 is set when the entry is invalid. The "internal network ID" is a common identifier identifying the device 500 in the PCIe network 3 formed among the plurality of PCIe switches. The "port number" is an identifier identifying a port that the PCIe switch 10 has, and a port number of an output destination of a packet is set.

To explain one example in FIG. 5, it indicates that a packet output destination assigned internal network ID "01234567" is a port with port number "0". Incidentally, the information stored in the path table 13 is updated by the management unit 200 and the like. Furthermore, the information illustrated in FIG. 5 is just an example, and items of the path table 13 are not limited to those illustrated in FIG. 5 and can be arbitrarily set and changed.

The first input buffer 14 is a storage unit that holds therein a PCIe packet input from the CPU 100. For example, the first input buffer 14 holds therein a PCIe packet as an access request transmitted from the CPU 100 to the device 500. The first relay unit 15 is a processing unit that retrieves out a PCIe packet stored in the first input buffer 14 and outputs the retrieved PCIe packet to the TLP adding unit 16. For example, the first relay unit 15 monitors the first input buffer 14, and, when a PCIe packet as an access request has been stored in the first input buffer 14, the first relay unit 15 retrieves the packet and outputs the retrieved packet to the TLP adding unit 16.

The TLP adding unit 16 is a processing unit that adds a TLP (Transaction Layer Packet) prefix to a PCIe packet retrieved by the first relay unit 15. Specifically, the TLP adding unit 16 adds a TLP prefix of a transaction layer, which is an optional feature based on PCIe, to a PCIe packet of a link layer output from the CPU 100. This allows for independent routing by a higher layer in the PCIe network 3, and also the link layer can use PCIe.

For example, the TLP adding unit 16 extracts logical address "0x2100", which denotes a destination, from the header of a PCIe packet input from the first relay unit 15. Next, the TLP adding unit 16 identifies PCI ID "0x0011" including the extracted logical address "0x2100" with reference to the PCI-ID conversion table 11 via the bridge connecting unit 18 and the second input buffer 19. Then, the TLP adding unit 16 identifies internal network ID "01234567" associated with the identified PCI ID "0x0011" with reference to the internal-network-ID conversion table 12. After that, the TLP adding unit 16 generates an extended PCIe packet that a TLP prefix including the internal network ID "01234567" is added to the PCIe packet input from the first relay unit 15, and outputs the extended PCIe packet to the first routing executing unit 17.

Figure 6:
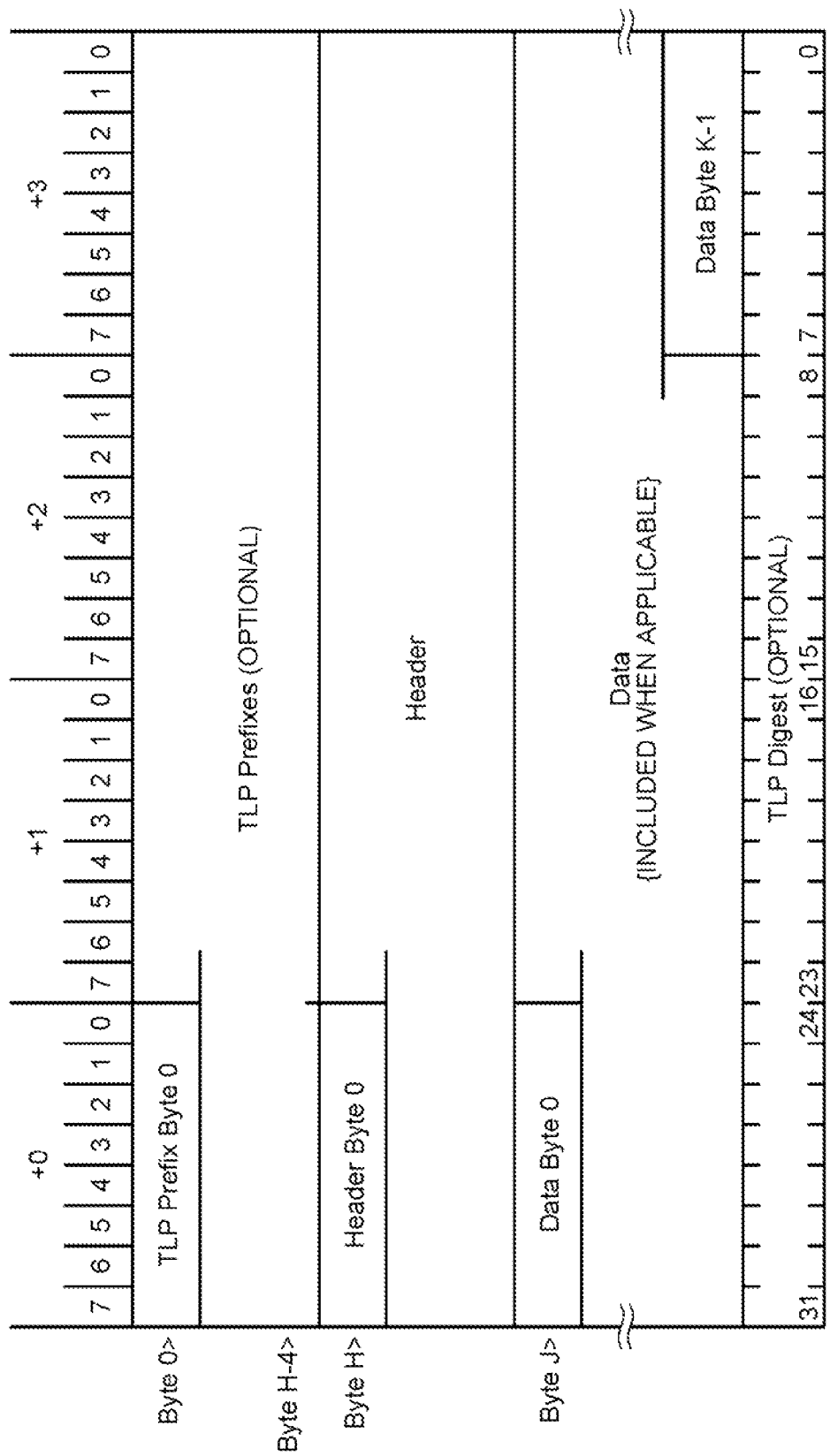
FIG. 6 is a diagram illustrating an example of a format of an extended PCIe packet.
Figure 7:
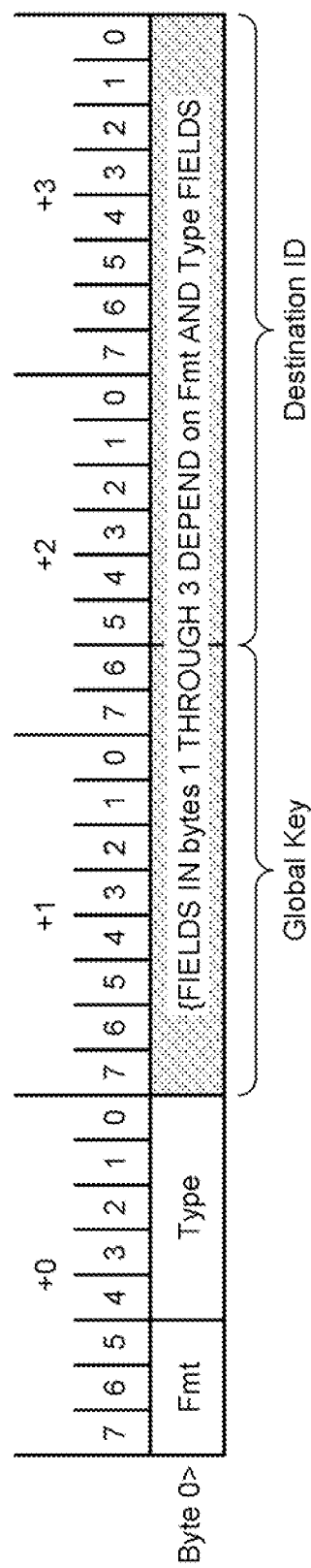
FIG. 7 is a diagram illustrating an example of a TLP prefix.

Here we explain about a TLP prefix. FIG. 6 is a diagram illustrating an example of a format of an extended PCIe packet; FIG. 7 is a diagram illustrating an example of a TLP prefix. FIGS. 6 and 7 illustrate an example of a bit format. As illustrated in FIG. 6, the extended PCIe packet includes TLP Prefixes, Header, Data, and TLP Digest.

As illustrated in FIG. 7, the TLP Prefixes is 32-bit information, and includes "Fmt", "Type", "Global Key", and "Destination ID". The "Fmt" is 3-bit information, and is a fixed value indicating being a TLP prefix. The "Type" is 5-bit information, and is a fixed value of 01110b or 01111b. This "Type" defines the use of VendPrefixL0 or VendPrefixL1 defined in the PCIe. The "Global Key" is 10-bit information, and is a key for protection and is used in communication of a packet having the same key. The "Destination ID" is 14-bit information, and is information for identifying a destination. The above-described internal network ID is stored in this "Destination ID".

The Header is 32-bit information, and information on a device specified by the CPU 100 is stored in the Header. Namely, the above-described logical address is stored in the Header. In the Data, processing content of an access request or actual data is stored. The TLP Digest is 32-bit information, and can be used optionally. Incidentally, a packet output by the CPU 100 is composed of the above-described Header and Data.

Furthermore, when a transmission source of the PCIe packet input from the first relay unit 15 is the device 500, the TLP adding unit 16 outputs the packet to the bridge connecting unit 18. Incidentally, the TLP adding unit 16 can determine a type of the packet depending on whether a transmission source stored in the Header of the input PCIe packet is a logical address of the device 500 or not.

To return to FIG. 2, the first routing executing unit 17 is a processing unit that outputs an extended PCIe packet to a destination. For example, the first routing executing unit 17 extracts internal network ID "01234567" from "Destination ID" of a TLP prefix included in an extended PCIe packet input from the TLP adding unit 16. Then, the first routing executing unit 17 identifies port number "0" associated with the extracted internal network ID "01234567" with reference to the path table 13. After that, the first routing executing unit 17 outputs the input extended PCIe packet and the port number "0" identified as an output destination of the extended PCIe packet to the crossbar 24.

The bridge connecting unit 18 is a processing unit that controls packet communication between the TLP adding unit 16 and the second input buffer 19. For example, the bridge connecting unit 18 relays communication for the TLP adding unit 16 referring to the PCI-ID conversion table 11. Furthermore, the bridge connecting unit 18 stores a PCIe packet which has been input from the TLP adding unit 16 and is to be transmitted to the CPU 100, i.e., a PCIe packet output from the device 500 in the second input buffer 19.

Moreover, the bridge connecting unit 18 outputs a packet with no TLP prefix added, which has been input to the second input buffer 19, to the TLP adding unit 16. Namely, the bridge connecting unit 13 receives a packet, which has been determined to be a packet with no TLP prefix added despite being a packet input from another switch, from the TLP identifying unit 21 and outputs the packet to the TLP adding unit 16.

Incidentally, the bridge connecting unit 18 can be configured to update each table upon receipt of a request to change the settings of the table from the management unit 200. At this time, the bridge connecting unit 18 updates a table via the TLP adding unit 16 and the first routing executing unit 17 or via the second input buffer 19. Furthermore, the management unit 200 can be configured to directly update each table via processing units through a network interface card, etc. (not illustrated).

The second input buffer 19 is a storage unit that holds therein an extended PCIe packet input from another PCIe switch and a packet with no TLP prefix added. Furthermore, the second input buffer 19 holds therein a PCIe packet which has been input from the bridge connecting unit 18 and is to be transmitted to the CPU 100, i.e., a PCIe packet output from the device 500.

The second relay unit 20 is a processing unit that retrieves a packet held in the second input buffer 19 and outputs the retrieved packet to the TLP identifying unit 21. For example, the second relay unit 20 monitors the second input buffer 19, and, when a packet has been stored in the second input buffer 19, the second relay unit 20 retrieves out the packet and outputs the retrieved packet to the TLP identifying unit 21.

The TLP identifying unit 21 is a processing unit that identifies a TLP prefix from a packet input from the second relay unit 20. For example, with reference to a packet input from the second relay unit 20, the TLP identifying unit 21 determines whether a TLP prefix has been added to the packet. Then, as for a packet with a TLP prefix added, the TLP identifying unit 21 outputs the packet to the second routing executing unit 22.

On the other hand, as for a packet with no TLP prefix added, the TLP identifying unit 21 identifies whether a destination is the CPU 100 or a device with reference to the header of the packet. Then, as for a packet with no TLP prefix added and of which the destination is the CPU 100, the TLP identifying unit 21 outputs the packet to the third routing executing unit 23. As for a packet with no TLP prefix added and of which the destination is the device 500, the TLP identifying unit 21 outputs the packet to the bridge connecting unit 18.

The second routing executing unit 22 is a processing unit that outputs an extended PCIe packet to a destination. For example, the second routing executing unit 22 extracts an internal network ID from "Destination ID" of a TLP prefix included in an extended PCIe packet input from the TLP identifying unit 21. Then, the second routing executing unit 22 identifies a port number associated with the extracted internal network ID with reference to the path table 13. After that, the second routing executing unit 22 outputs the input extended PCIe packet and the port number of an output destination of the extended PCIe packet to the crossbar 24.

The third routing executing unit 23 is a processing unit that outputs a packet input from the TLP identifying unit 21 to a destination. For example, the third routing executing unit 23 extracts a PCI ID or a logical address from the header of the packet input from the TLP identifying unit 21. Then, the third routing executing unit 23 identifies a host number associated with the extracted PCI ID or logical address with reference to the PCI-ID conversion table 11. After that, the third routing executing unit 23 outputs the input packet and the identified host number of a destination to the crossbar 24.

The crossbar 24 is a processing unit that switches an output destination on the basis of a destination of an input packet, and outputs the packet to the switched destination. This crossbar 24 can recognize that the role of the switch is any of a terminal switch, a relay switch, and a top switch from an administrator or the settings of the management unit 200. Incidentally, the terminal switch here denotes a PCIe switch that is directly connected to the device 500. The relay switch denotes a PCIe switch that is directly connected to neither the CPU 100 nor the device 500 and relays a packet. The top switch denotes a PCIe switch that is directly connected to the CPU 100.

For example, when the crossbar 24 has received an extended PCIe packet and a port number of a destination from the first routing executing unit 17 or the second routing executing unit 22, the crossbar 24 identifies the role of the switch. Then, when the crossbar 24 has determined that the role of the switch is a relay switch or a top switch, the crossbar 24 switches a switching circuit and connects to the fourth relay unit 28. Then, the crossbar 24 outputs the received extended PCIe packet and an instruction to output the extended PCIe packet to the specified port number to the fourth relay unit 28.

Furthermore, when the crossbar 24 has determined that the role of the switch is a terminal switch, the crossbar 24 switches the switching circuit and connects to the TLP deleting unit 25. Then, the crossbar 24 outputs the received extended PCIe packet and an instruction to output the extended PCIe packet to the specified port number to the TLP deleting unit 25.

Moreover, when a packet has been input from the third routing executing unit 23, the crossbar 24 switches the switching circuit and connects to the TLP deleting unit 25. Then, the crossbar 24 outputs the input packet and an instruction to output the packet to a destination host number to the TLP deleting unit 25. Namely, when the switch is a top switch, and also an input packet is a response to the CPU 100, the crossbar 24 transmits the packet to the CPU 100.

The TLP deleting unit 25 is a processing unit that deletes a TLP prefix from a packet input from the crossbar 24 if there is any TLP prefix in the input packet, and outputs the packet to the third relay unit 26. At this time, the TLP deleting unit 25 also outputs a destination port number or host number input from the crossbar 24 to the third relay unit 26. Namely, when a packet is transmitted to the outside of the PCIe network 3, the TLP deleting unit 25 restores an extended PCIe packet to a normal packet, and outputs the restored packet.

The third relay unit 26 is a processing unit that outputs a packet input from the TLP deleting unit 25 to the first output buffer 27 which is a destination. For example, when a packet and a port number have been input from the TLP deleting unit 25, the third relay unit 26 stores the packet in the first output buffer 27 corresponding to the port number. Furthermore, when a packet and a host number have been input from the TLP deleting unit 25, the third relay unit 26 stores the packet in the first output buffer 27 corresponding to the host number.

The first output buffer 27 is a storage unit that holds therein a packet input from the third relay unit 26. This first output buffer 27 is installed with respect to each of ports that the PCIe switch 10 has. A packet held in the first output buffer 27 is retrieved by the third relay unit 26 or the like and is output from a port. Incidentally, the number of the first output buffers 27 in the PCIe switch 10 can be one.

The fourth relay unit 28 is a processing unit that outputs a packet input from the crossbar 24 to the second output buffer 29 which is a destination. Specifically, the fourth relay unit 28 receives an extended PCIe packet and a port number, and stores the extended PCIe packet in the second output buffer 29 corresponding to the port number.

The second output buffer 29 is a storage unit that holds therein an extended PCIe packet input from the fourth relay unit 28. This second output buffer 29 is installed with respect to each of ports that the PCIe switch 10 has. An extended PCIe packet held in the second output buffer 29 is retrieved by the third relay unit 26 or the like and is output from a port. Incidentally, the number of the second output buffers 29 in the PCIe switch 10 can be one.

Flow of Process

Subsequently, the flow of a process performed by the PCIe switch 10 is explained. Here, the process flow when the PCIe switch 10 has received a packet from the CPU 100 and the process flow when the PCIe switch 10 has received a packet from another switch are explained.

Receipt of Packet from CPU

Figure 8:
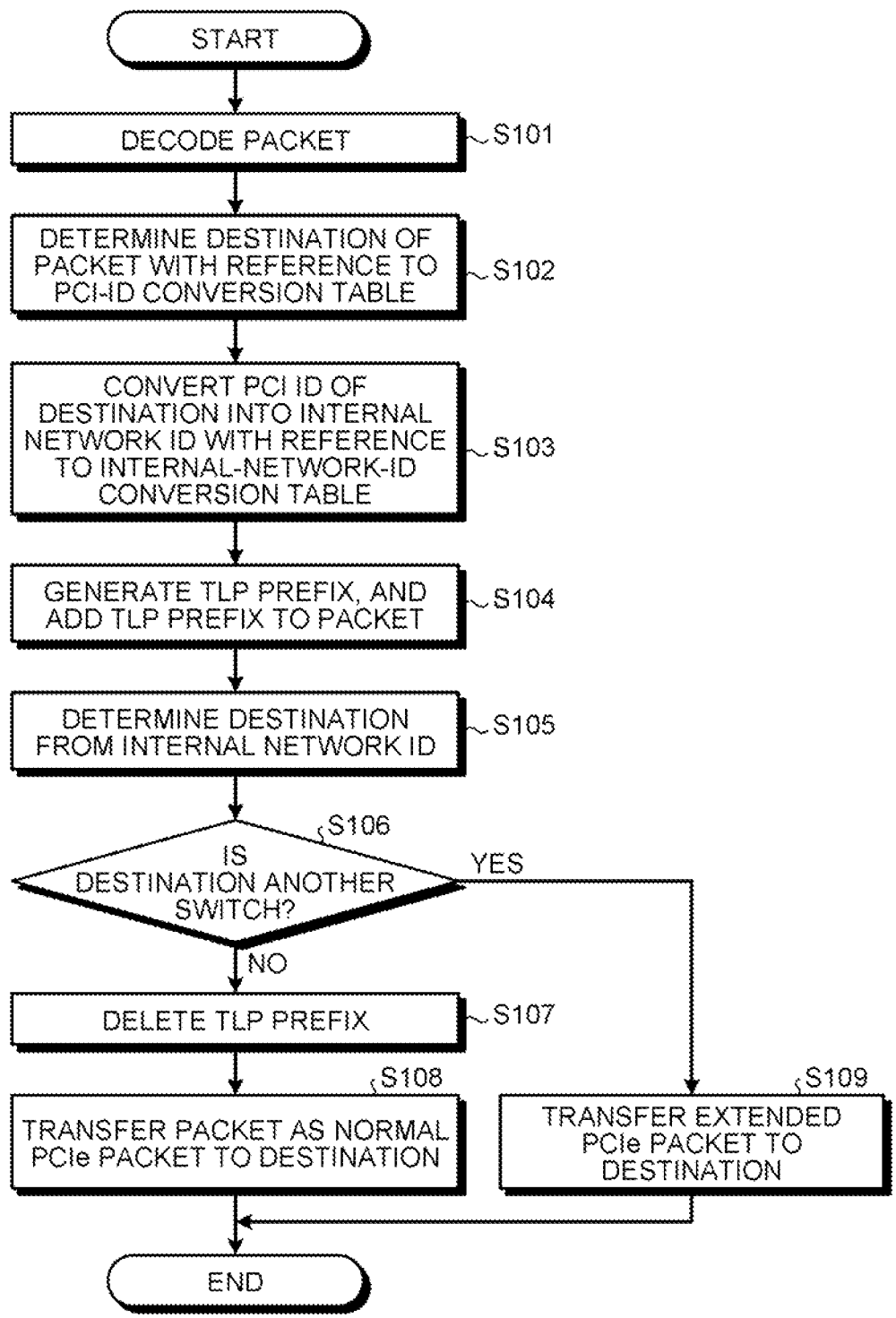
FIG. 8 is a flowchart illustrating the flow of a process performed by the PCIe switch when having received a packet from a CPU.

FIG. 8 is a flowchart illustrating the flow of a process performed by the PCIe switch 10 when having received a packet from the CPU. As illustrated in FIG. 8, the TLP adding unit 16 of the PCIe switch 10 decodes the packet (Step S101). For example, the TLP adding unit 16 receives a packet that the first relay unit 15 has retrieved from the first input buffer 14.

Next, the TLP adding unit 16 identifies a PCI ID corresponding to a logical address read out from the header of the packet with reference to the PCI-ID conversion table 11, and determines a destination of the packet (Step S102).

Then, the TLP adding unit 16 identifies an internal network ID corresponding to the identified PCI ID with reference to the internal-network-ID conversion table 12, and converts the PCI ID of the destination into an internal network ID (Step S103). After that, the TLP adding unit 16 generates a TLP prefix indicating the internal network ID as the destination, and generates an extended PCIe packet by adding the TLP prefix to the decoded packet (Step S104).

Then, the first routing executing unit 17 identifies a port number associated with the internal network ID included in the extended PCIe packet with reference to the path table 13, and determines a destination (Step S105).

After that, the crossbar 24 determines a type of the destination on the basis of the role of the switch or the port number, etc. (Step S106). Then, when the crossbar 24 has determined that the destination is the CPU 100 or the device 500 (NO at Step S106), the TLP deleting unit 25 deletes the TLP prefix from the extended PCIe packet input from the crossbar 24 (Step S107). After that, the third relay unit 26 transmits the packet that the TLP prefix has been deleted as a normal PCIe packet to the destination via the first output buffer 27 (Step S108).

On the other hand, when the crossbar 24 has determined that the destination is another switch (YES at Step S106), the fourth relay unit 28 transmits the extended PCIe packet input from the crossbar 24 to the destination via the second output buffer 29 (Step S109).

Receipt of Packet from Another Switch

Figure 9:
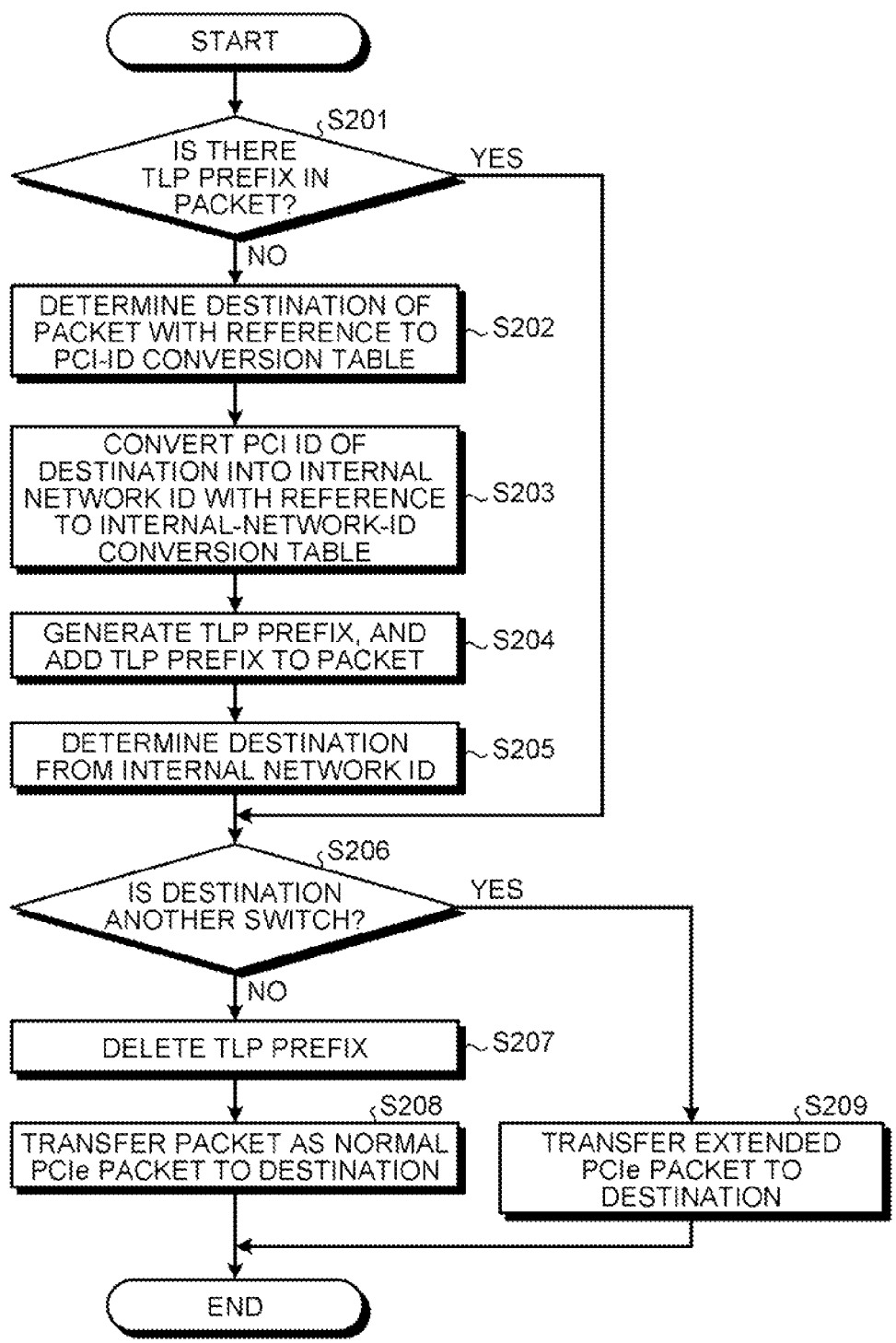
FIG. 9 is a flowchart illustrating the flow of a process performed by the PCIe switch when having received a packet from another switch.

FIG. 9 is a flowchart illustrating the flow of a process performed by the PCIe switch 10 when having received a packet from another switch. As illustrated in FIG. 9, the TLP identifying unit 21 of the PCIe switch 10 determines whether a TLP prefix has been added to an input packet (Step S201). Namely, the TLP identifying unit 21 determines whether a packet retrieved from the second input buffer 19 by the second relay unit 20 is an extended PCIe packet.

Then, when the TLP identifying unit 21 has determined that the input packet is not an extended PCIe packet (NO at Step S201), the TLP adding unit 16 performs the same processes at Steps S102 to S105, and generates an extended PCIe packet (Steps S202 to S205).

When the TLP identifying unit 21 has determined that the input packet is an extended PCIe packet (YES at Step S201) or after Step S205, the crossbar 24 determines a type of the destination on the basis of the role of the switch or the port number, etc. (Step S206).

Then, when the crossbar 24 has determined that the destination is the CPU 100 or the device 500 (NO at Step S206), the TLP deleting unit 25 deletes the TLP prefix from the extended PCIe packet input from the crossbar 24 (Step S207). After that, the third relay unit 26 transmits the packet that the TLP prefix has been deleted as a normal PCIe packet to the destination via the first output buffer 27 (Step S208).

On the other hand, when the crossbar 24 has determined that the destination is another switch (YES at Step S206), the fourth relay unit 28 transmits the extended PCIe packet input from the crossbar 24 to the destination via the second output buffer 29 (Step S209).

Flow of Packet

Figure 10:
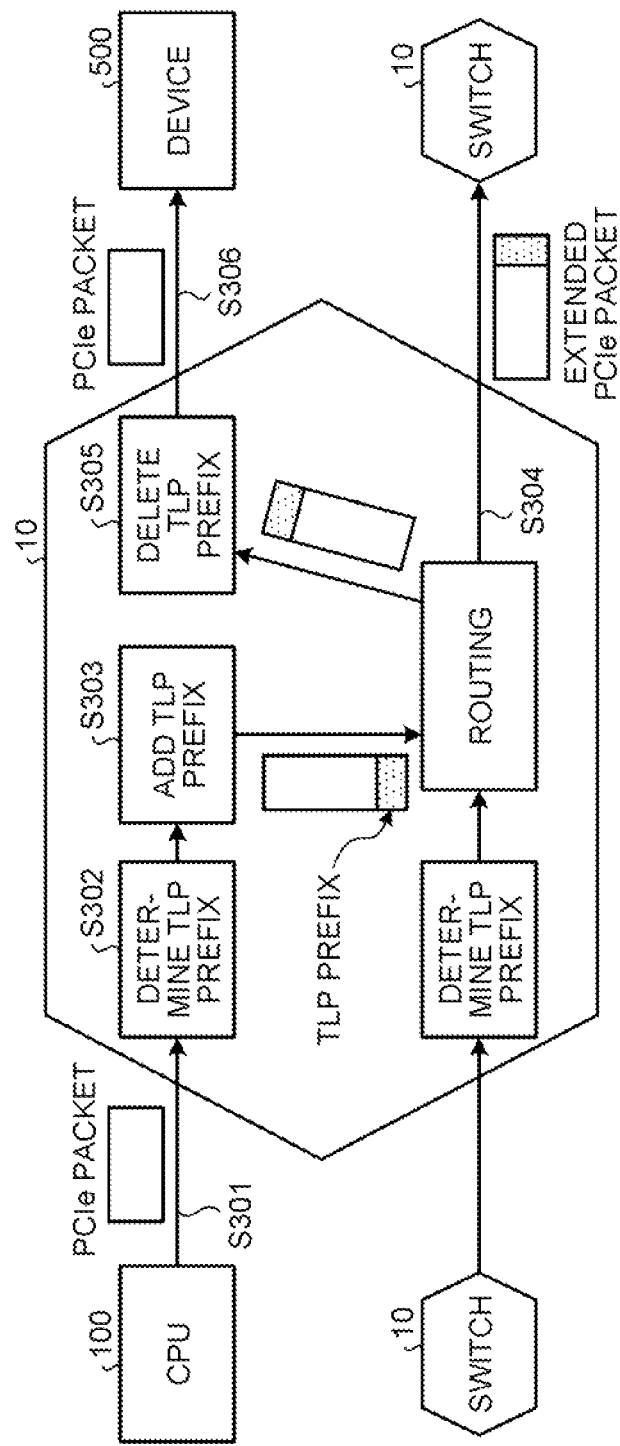
FIG. 10 is a diagram for explaining the flow of a packet.

Subsequently, the flow of an access request output from the CPU 100, i.e., a packet until the packet is delivered to the device 500 is explained. FIG. 10 is a diagram for explaining the flow of the packet. As illustrated in FIG. 10, the CPU 100 transmits a normal PCIe packet to the device 500 through a PCIe link (Step S301).

The PCIe switch 10 generates a TLP prefix including an internal network ID corresponding to a destination device to which the received PCIe packet is to be output (Step S302). Then, the PCIe switch 10 generates an extended PCIe packet by adding the generated TLP prefix to the received PCIe packet (Step S303).

After that, when an output destination identified by the internal network ID included in the extended PCIe packet is another switch, the PCIe switch 10 transmits the extended PCIe packet to the destination (Step S304).

On the other hand, when an output destination identified by the internal network ID included in the extended PCIe packet is the device 500, the PCIe switch 10 generates the original PCIe packet by deleting the TLP prefix from the extended PCIe packet (Step S305). After that, the PCIe switch transmits the PCIe packet to the device 500 (Step S306). Incidentally, as for an extended PCIe packet input from another PCIe switch, the PCIe switch 10 performs the processes at Steps S304 to S306 using an internal network ID included in the extended PCIe packet.

In this manner, the PCIe switch 10 performs routing of a packet on the basis of network routing information written in a TLP prefix, and relays the packet to a target destination. Accordingly, the PCIe switch 10 can perform the routing independent of the standard of PCI Express, and therefore can adopt any network configuration. Namely, in the related technology, when the plurality of PCIe switches are connected, it is difficult for the loop structure to be used; however, by using the above-described technique, the loop structure can be used.

Furthermore, in the present embodiment, a packet is extended by using a TLP prefix which can be optionally used in PCIe, and the extension of a packet is executed inside of the PCIe switch 10. Therefore, the CPU 100 just has to transmit an access request as is conventionally done without adding a new function to the CPU 100 or the device 500. This allows for packet routing using a unique routing method while minimizing changes from a standard PCIe switch, and it is possible to use an unrestrained connection configuration of PCIe switches which was conventionally not available.

Moreover, the loop structure can be adopted, so redundant paths can be easily made. Furthermore, as described above, it is possible to relax limits on connections among the plurality of PCIe switches and also possible to permit duplicate connection; therefore, a configuration of a PCIe switch and management of the settings, etc. of the PCIe switch can be simplified.

[b] Second Embodiment

In the first embodiment, an example where the PCIe switch performs independent routing is explained; when a path is interrupted, the PCIe switch according to the present invention can switch the path to another path. In a second embodiment, there is explained an example where path switching is performed in the event of a failure of a network composed of PCIe switches.

Physical Configuration

Figure 11:
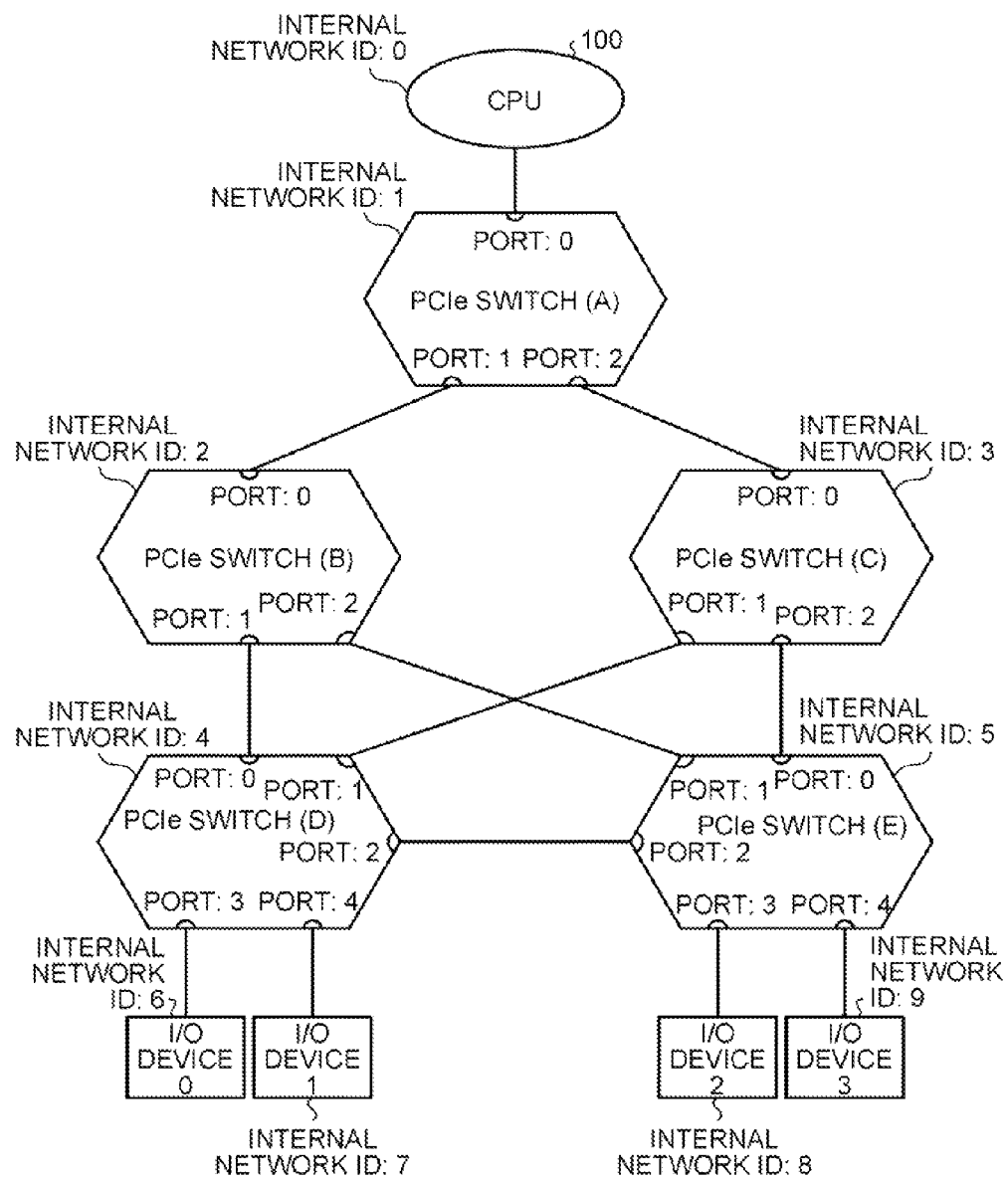
FIG. 11 is a diagram illustrating a physical configuration using PCIe switches.

FIG. 11 is a diagram illustrating a physical configuration using PCIe switches. As illustrated in FIG. 11, an information processing apparatus according to the second embodiment has the same configuration as that is illustrated in FIG. 1. Specifically, a packet of an access request output from the CPU 100 gets to the device 500 via the plurality of PCIe switches. Incidentally, the PCIe switches have the same configuration as the PCIe switch 10 described in the first embodiment.

Here, a concrete physical configuration postulated in the second embodiment is explained. A PCIe switch (A) is connected to the CPU 100 through a port 0, connected to a PCIe switch (B) through a port 1, and connected to a PCIe switch (C) through a port 2. Furthermore, the PCIe switch (B) is connected to the PCIe switch (A) through a port 0, connected to a PCIe switch (D) through a port 1, and connected to a PCIe switch (E) through a port 2. Likewise, the PCIe switch (C) is connected to the PCIe switch (A) through a port 0, connected to the PCIe switch (D) through a port 1, and connected to the PCIe switch (E) through a port 2.

Moreover, the PCIe switch (D) is connected to the PCIe switch (B) through a port 0, connected to the PCIe switch (C) through a port 1, and connected to the PCIe switch (E) through a port 2. Furthermore, the PCIe switch (D) is connected to an I/O device 0 through a port 3, and connected to an I/O device 1 through a port 4.

Likewise, the PCIe switch (E) is connected to the PCIe switch (C) through a port 0, connected to the PCIe switch (B) through a port 1, and connected to the PCIe switch (D) through a port 2. Furthermore, the PCIe switch (E) is connected to an I/O device 2 through a port 3, and connected to an I/O device 3 through a port 4.

In the PCIe network, the PCIe switches identify each device by an internal network ID. Here, the PCIe switches identify the CPU 100 by an internal network ID 0, identify the PCIe switch (A) by an internal network ID 1, and identify the PCIe switch (B) by an internal network ID 2. Furthermore, the PCIe switches identify the PCIe switch (C) by an internal network ID 3, identify the PCIe switch (D) by an internal network ID 4, and identify the PCIe switch (E) by an internal network ID 5.

Moreover, in the PCIe network, the PCIe switches identify the I/O device 0 by an internal network ID 6, and identify the I/O device 1 by an internal network ID 7. Furthermore, the PCIe switches identify the I/O device 2 by an internal network ID 8, and identify the I/O device 3 by an internal network ID 9.

In this manner, in the form where in which the plurality of PCIe switches are connected, the information processing apparatus according to the second embodiment connects the CPU 100 to the I/O devices. Furthermore, as illustrated in FIG. 11, the PCIe switches are set in a multistage configuration.

Logical Configuration

Figure 12:
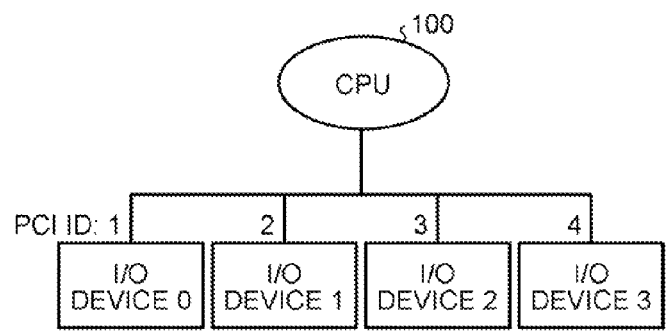
FIG. 12 is a diagram illustrating a logical configuration when

Meanwhile, the CPU 100 can access an I/O device by using a related PCIe packet. FIG. 12 is a diagram illustrating a logical configuration when FIG. 11 is viewed from the CPU. Unlike the PCIe switch, the CPU 100 identifies each I/O device by a PCI ID as illustrated in FIG. 12. Incidentally, as an example, a PCI ID is used here; alternatively, a logical address can be used to identify an I/O device. Specifically, when accessing the I/O device 0, the CPU 100 specifies a PCI ID 1, thereby accessing the I/O device 0. Namely, by transmitting a PCIe packet including a PCI ID 1, the CPU 100 can write data to the I/O device 0.

Figure 13:
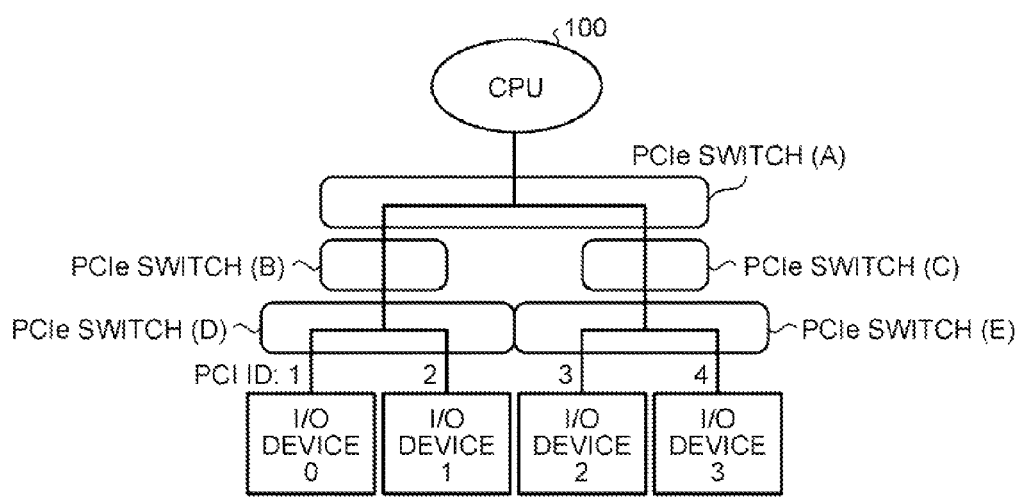
FIG. 13 is a diagram illustrating a logical configuration when

Incidentally, a related PCIe switch forms a logical virtual bus to connect the CPU 100 to an I/O device. FIG. 13 is a diagram illustrating a logical configuration when FIG. 11 is viewed from a related technology. As illustrated in FIG. 13, in the case of the related technology, each PCIe switch forms a virtual bus in a unique logical configuration. Accordingly, from the CPU 100, paths to the I/O devices look like a tree structure of the virtual buses formed by the PCIe switches. Therefore, routing is subject to the limitation of the PCIe switches, and a loop structure is not able to be used.

Table Configuration

Subsequently, a configuration of a table held in the PCIe switches illustrated in FIG. 11 is explained. Incidentally, here, a table used in the explanation of change in a path is explained. FIG. 14 is a diagram illustrating an example of an internal-network-ID conversion table held in the PCIe switch (A). This table can be held in only the PCIe switch (A) or in all the PCIe switches. As illustrated in FIG. 14, the PCIe switch (A) stores therein "Valid", a "host number", a "PCI ID", and an "internal network ID" in an associated manner. Specifically, the PCIe switch (A) holds therein information that PCI ID 1 is converted into the internal network ID 6, and PCI ID 2 is converted into the internal network ID 7. Furthermore, the PCIe switch (A) holds therein information that PCI ID 3 is converted into the internal network ID 8, and PCI ID 4 is converted into the internal network ID 9.

Furthermore, the PCIe switches also hold therein a path table. FIG. 15 is a diagram illustrating an example of respective path tables held in the PCIe switches. As illustrated in FIG. 15, the PCIe switches store therein "Valid", an "internal network ID", and a "port number" in an associated manner. As an example, the PCIe switch (A) holds therein information that an extended PCIe packet to a destination corresponding to the internal network ID 0 is output to the port 0, and an extended PCIe packet to a destination corresponding to the internal network ID 8 is output to the port 2.

Furthermore, the PCIe switch (B) holds therein information that an extended PCIe packet to a destination corresponding to the internal network ID 6 is output to the port 1. Moreover, the PCIe switch (C) holds therein information that an extended PCIe packet to a destination corresponding to the internal network ID 8 is output to the port 2. Furthermore, the PCIe switch (D) holds therein information that an extended PCIe packet to a destination corresponding to the internal network ID 7 is output to the port 4. Moreover, the PCIe switch (E) holds therein information that an extended PCIe packet to a destination corresponding to the internal network ID 8 is output to the port 3.

Figure 16:
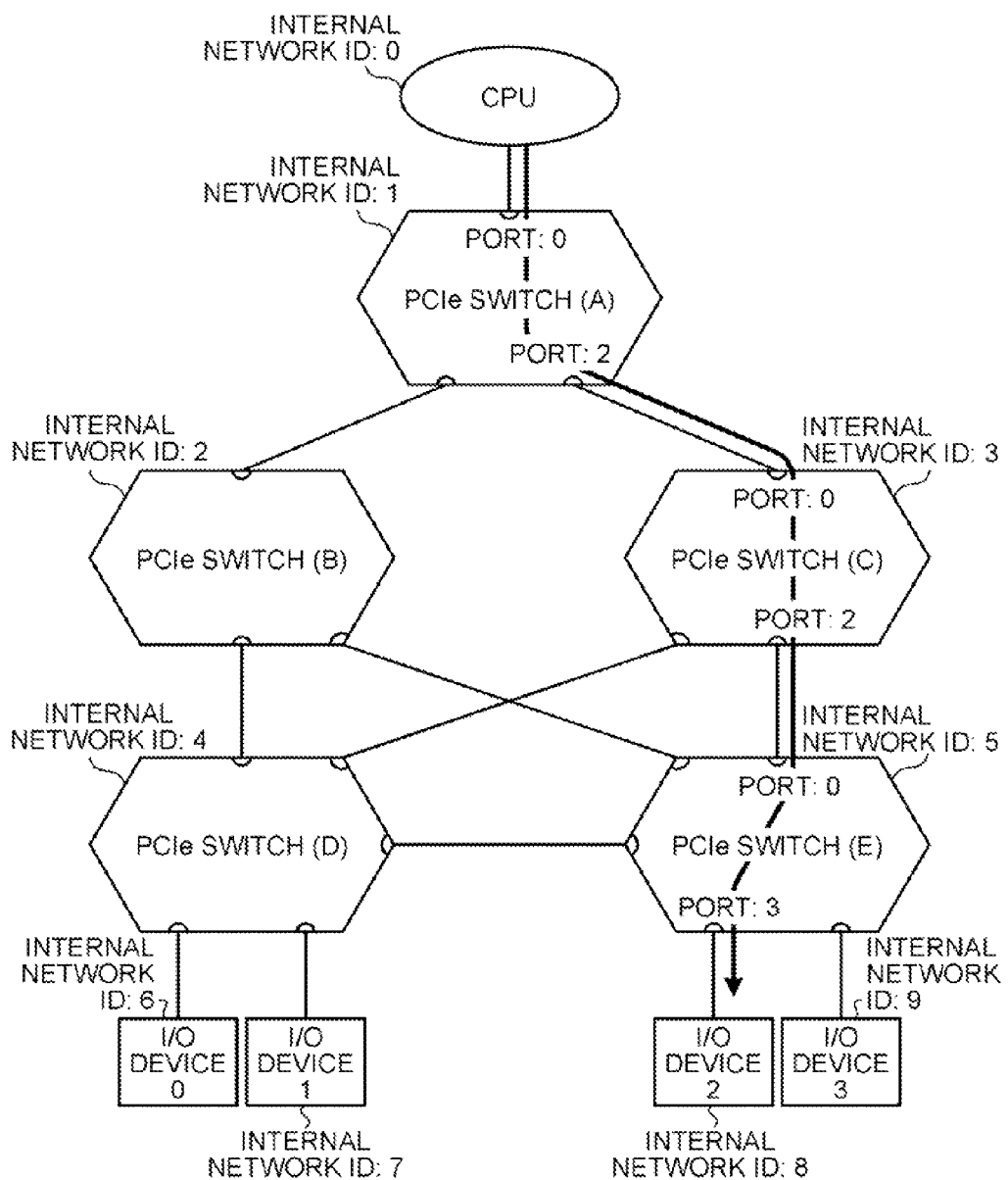
FIG. 16 is a diagram illustrating a path to an I/O device 2.

As an example, an access path from the CPU 100 to the I/O device 2 under the above conditions is explained. FIG. 16 is a diagram illustrating the path to the I/O device 2. As illustrated in FIG. 16, the CPU 100 transmits a packet in which a logical address of the I/O device 2 is specified as a packet indicating a request for access to the I/O device 2 to the PCIe switch (A).

The PCIe switch (A) identifies "3" as a PCI ID corresponding to the logical address included in the packet received from the CPU 100 with reference to the table illustrated in FIG. 14. Next, the PCIe switch (A) identifies "8" as an internal network ID associated with the PCI ID 3 with reference to the table illustrated in FIG. 15. As a result, the PCIe switch (A) converts the logical address specified by the CPU 100 into the internal network ID "8".

After that, the PCIe switch (A) generates an extended PCIe packet including the internal network ID "8" as a new destination, and transmits the extended PCIe packet to the PCIe switch (C) connected to the port 2 identified as the destination by reference to the table illustrated in FIG. 15. Then, the PCIe switch (C) extracts the internal network ID "8" with reference to a TLP prefix of the extended PCIe packet received from the PCIe switch (A). After that, the PCIe switch (C) identifies the port number "2" associated with the internal network ID "8" with reference to the table illustrated in FIG. 15, and transmits the extended PCIe packet to the PCIe switch (E) connected to the port 2.

Then, the PCIe switch (E) extracts the internal network ID "8" with reference to the TLP prefix of the extended PCIe packet received from the PCIe switch (C). After that, the PCIe switch (E) identifies the port number "3" associated with the internal network ID "8" with reference to the table illustrated in FIG. 15. As the PCIe switch (E) recognizes that the PCIe switch (E) is a terminal switch, the PCIe switch (E) generates the original PCIe packet by deleting the TLP prefix from the received extended PCIe packet. After that, the PCIe switch (E) transmits the original PCIe packet to the I/O device 2 connected to the port 3.

Path Switching

Figure 17:
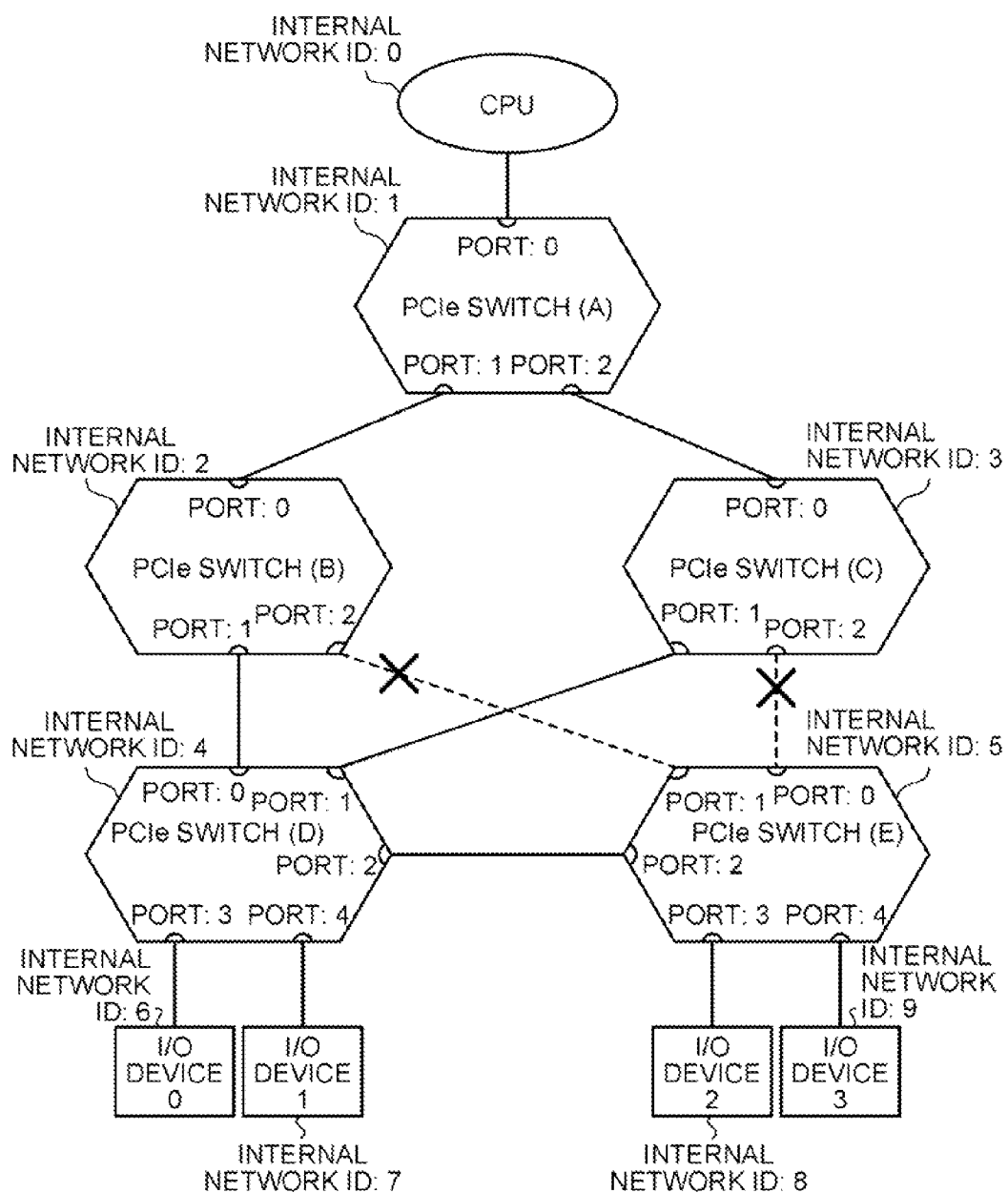
FIG. 17 is a diagram illustrating a network failure between PCIe switches.

Subsequently, an example where a network failure has occurred in the path from the CPU 100 to the I/O device 2 illustrated in FIG. 16 is explained. FIG. 17 is a diagram illustrating a network failure between PCIe switches. As illustrated in FIG. 17, it is assumed that failures have occurred in a network between the PCIe switches (B) and (E) and a network between the PCIe switches (C) and (E). Namely, it is assumed that communication from the port 2 of the PCIe switch (C) to the port 0 of the PCIe switch (E) has been interrupted, and also, communication from the port 2 of the PCIe switch (B) to the port 1 of the PCIe switch (E) has been interrupted.

In this case, the management unit 200 updates the respective path tables of the PCIe switches. Specifically, when the management unit 200 has detected the network failures by administrator's operation or a general failure management tool, etc., the management unit 200 updates the respective path tables of the PCIe switches, and sets detours from the CPU 100 to the I/O devices 2 and 3. Namely, the management unit 200 resets the path from the CPU 100 to a destination corresponding to the internal network ID 8 and the path from the CPU 100 to a destination corresponding to the internal network ID 9, and sets the new paths. Furthermore, the management unit 200 resets the path from the I/O device 2 or 3 to the CPU 100, i.e., the path from a device corresponding to the internal network ID 8 or 9 to a device corresponding to the internal network ID 0, and sets the new path.

FIG. 18 is a diagram illustrating an example of updated tables. As illustrated in FIG. 18, the management unit 200 changes the port number 2 associated with the internal network IDs 8 and 9 in the path table held in the PCIe switch (B) to 1. Furthermore, the management unit 200 changes the port number 2 associated with the internal network IDs 8 and 9 in the path table held in the PCIe switch (C) to 1. Moreover, the management unit 200 changes the port number 0 associated with the internal network ID 0 in the path table held in the PCIe switch (E) to 2.

Figure 19:
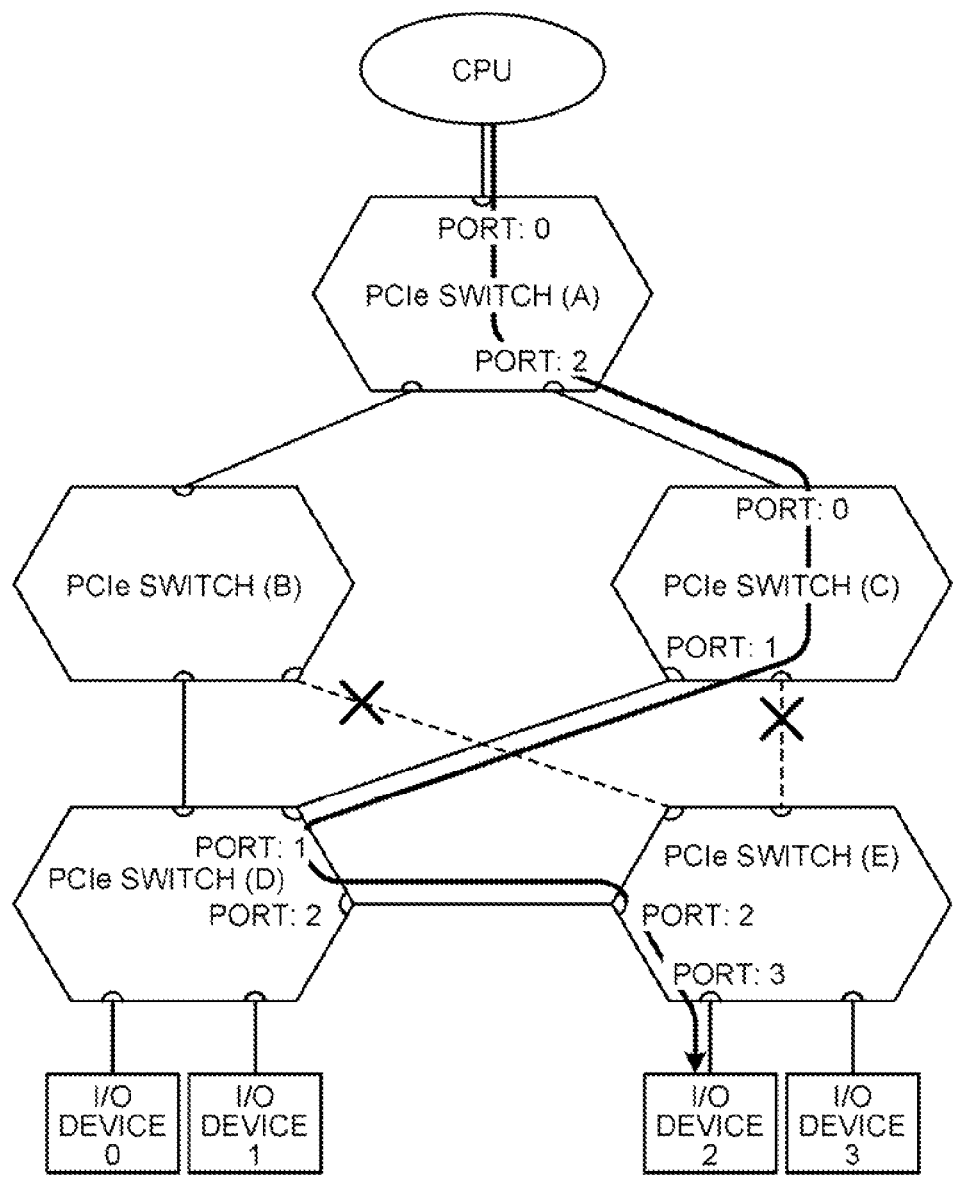
FIG. 19 is a diagram illustrating a physical configuration after path switching.

As a result, as illustrated in FIG. 19, a new path can be set. FIG. 19 is a diagram illustrating a physical configuration after the path switching. As illustrated in FIG. 19, the CPU 100 transmits a packet in which a logical address of the I/O device 2 is specified as a packet indicating a request for access to the I/O device 2 to the PCIe switch (A). The PCIe switch (A) converts a PCI ID "3" of the packet received from the CPU 100 into an internal network ID "8", and generates an extended PCIe packet. Then, the PCIe switch (A) identifies a port number "2" associated with the internal network ID "8" with reference to the table illustrated in FIG. 18. After that, the PCIe switch (A) transmits the extended PCIe packet to the PCIe switch (C) connected to the port 2.

Then, the PCIe switch (C) identifies a port number "1" associated with the internal network ID "8" included in the received extended PCIe packet with reference to the table illustrated in FIG. 18. After that, the PCIe switch (C) transmits the extended PCIe packet to the PCIe switch (D) connected to the port 1.

Then, the PCIe switch (D) identifies a port number "2" associated with the internal network ID "8" included in the received extended PCIe packet with reference to the table illustrated in FIG. 18. After that, the PCIe switch (D) transmits the extended PCIe packet to the PCIe switch (E) connected to the port 2.

After that, the PCIe switch (E) identifies a port number "3" associated with the internal network ID "8" included in the received extended PCIe packet with reference to the table illustrated in FIG. 18. After that, the PCIe switch (E) transmits a normal PCIe packet, which is obtained by deleting a TLP prefix from the extended PCIe packet, to the I/O device 2 connected to the port 3.

In this manner, the normally-used path, i.e., the path from the CPU 100 to the I/O device 2 via the PCIe switches (A), (C), and (E) can be changed. Specifically, the normally-used path can be switched to the path from the CPU 100 to the I/O device 2 via the PCIe switches (A), (C), (D), and (E). Namely, even when a failure has occurred in a network formed between PCIe switches, a detour can be easily set just by changing the path tables in accordance with the settings made by the management unit 200.

Figure 20:
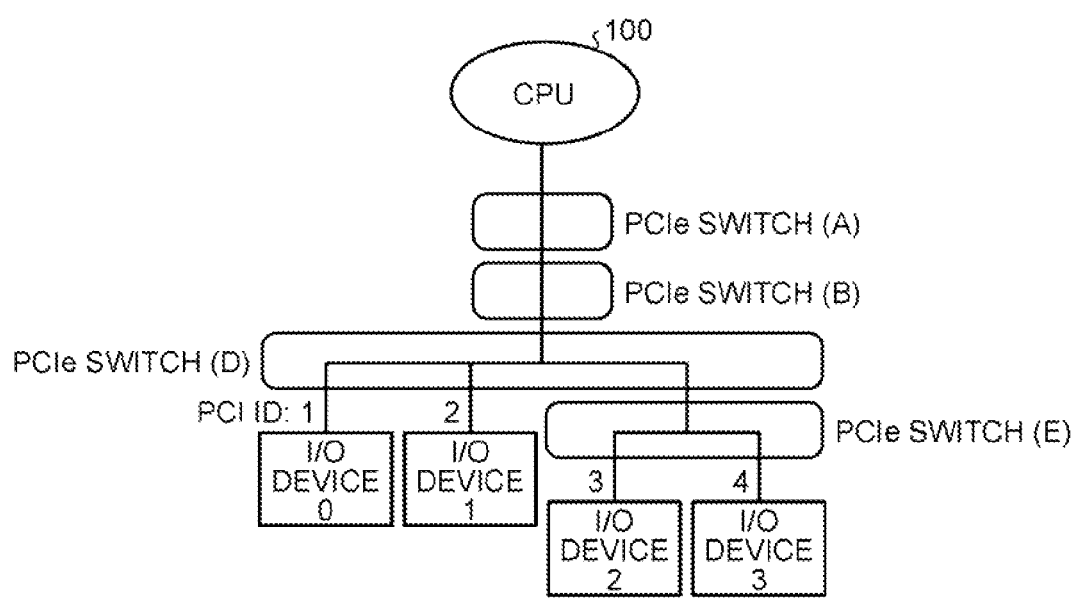
FIG. 20 is a diagram illustrating a logical configuration after the path switching when the related technology is used.

Incidentally, in the related technology, as illustrated in FIG. 20, the logical configuration is changed with a change in the physical configuration. FIG. 20 is a diagram illustrating a logical configuration after the path switching when the related technology is used. As can be seen from a comparison between FIGS. 20 and 13, after the path switching, the logical configuration of the PCIe switches existing between the CPU 100 and the I/O devices is different from that of before the path switching. Specifically, the logical configuration illustrated in FIG. 20 does not include the PCIe switch (C). This is because in the case of the related technology, a path from the CPU 100 to each I/O device is not a network formed between PCIe switches but a logical path using PCI ID. Therefore, in the case of the related technology, when a path is switched, not only is a table held in each PCIe switch simply updated, but also are the maintenance of the tree structure and the limitation of the loop structure considered, so the path cannot be easily switched.

In this manner, the PCIe switch according to the second embodiment can perform the routing independent of the standard of PCIe, and therefore can adopt any bond network configuration. For example, using a multiplex link, the PCIe switch can easily relay a packet by switching a link to be used.

[c] Third Embodiment

The embodiments of the present invention are described above; besides the above-described embodiments, the present invention can be embodied in various different forms. Different embodiments are explained below.

CPU

In the first and second embodiments, there is described an example where the information processing apparatus includes one CPU; however, the number of CPUs is not limited to one, and the information processing apparatus can include a plurality of CPUs. As illustrated in FIGS. 3 and 4, a host number for identifying a CPU is included in the tables, so the same processing as in the first and second embodiments can be performed.

Furthermore, in the above embodiments, there is described an example of the transmission of a packet from the CPU 100 to the device 500; also in the transmission of a response from a device to a CPU, the same technique as in the embodiments can be used. For example, an internal network ID for identifying a CPU and a port number are stored in the path table held in each PCIe switch in an associated manner. When a PCIe switch has received a response packet from the device 500 to a CPU, the PCIe switch extracts a logical address or PCI ID of the transmission source device from the response packet. Then, the PCIe switch identifies a host number corresponding to the extracted logical address or PCI ID with reference to the PCI-ID conversion table.

After that, the PCIe switch identifies an internal network ID corresponding to the identified host number with reference to the internal-network-ID conversion table. Then, the PCIe switch generates an extended PCIe packet using the identified internal network ID, and transfers the extended PCIe packet to a switch in the same manner as in the first embodiment. In doing this way, also in the transmission of a response from a device to a CPU, it can be processed in the same manner as in the embodiments.

Type of Switch

In the above embodiments, there is described the case where PCIe switches are used: however, a type of switch is not limited to this, and other switches having the same function as the PCIe switch can process in the same manner.

System

Out of the processes described in the present embodiments, all or part of the process described as the automatically-performed one can be manually performed. Furthermore, all or part of the process described as the manually-performed one can be automatically performed by a publicly-known technique. In addition, the processing procedures, control procedures, specific names, and information including various data and parameters illustrated in the above description and the drawings can be arbitrarily changed unless otherwise specified.

Furthermore, components of the apparatus illustrated in the drawings are functionally conceptual ones, and do not always have to be physically configured as illustrated in the drawings. Namely, the specific forms of division and integration of components of the apparatus are not limited to those illustrated in the drawings. In other words, all or some of the components can be configured to be functionally or physically divided or integrated in arbitrary units depending on respective loads and use conditions, etc.

It is possible to relax limits on connections among a plurality of switches.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A switch comprising:
   a memory; and
   a processor coupled to the memory, wherein the processor executes a process comprising:
   storing, in the memory, a first identifier used by a Central Processing Unit (CPU) that accesses a device using Peripheral Component Interconnect (PCI) Express to identify the device, a second identifier that is a common identifier to identify the device in a network formed among a plurality of switches that connect the CPU to the device, and a destination of an access request to the device in an associated manner;
   identifying, when the switch has received the access request from the CPU, the second identifier and the destination that are associated with the first identifier included in the access request in the memory;
   adding the second identifier identified at the identifying to the access request, the adding writes the second identifier identified at the identifying in a Transaction Layer Packet (TLP) prefix area of the PCI Express in the access request transmitted from the CPU using the PCI Express;
   when the destination identified at the identifying is another switch, transmitting the access request with the second identifier to the destination identified at the identifying; and
   when the destination identified at the identifying is the device, deleting the second identifier from the access request and transmitting the access request with no second identifier.

2. The switch according to claim 1, wherein
   when the second identifier is included in the access request received from another switch, the identifying identifies the destination associated with the second identifier in the memory, and
   the transmission transmits the received access request to the destination identified at the identifying.

3. The switch according to claim 1, wherein the processor executes a process further comprising changing, when the switch has received an instruction to change the destination stored in the memory from a management server that manages the switch, the destination stored in the memory to specified content.

4. An information processing apparatus comprising:
   a memory; and
   a processor coupled to the memory, wherein the processor executes a process comprising:
   storing, in the memory, a first identifier used by a Central Processing Unit (CPU) that accesses a device using Peripheral Component Interconnect (PCI) Express to identify the device, a second identifier that is a common identifier to identify the device in a network formed among a plurality of switches that connect the CPU to the device, and a destination of an access request to the device in an associated manner;
   identifying, when the information processing apparatus has received the access request from the CPU, the second identifier and the destination that are associated with the first identifier included in the access request in the memory;
   adding the second identifier identified at the identifying to the access request, the adding writes the second identifier identified at the identifying in a Transaction Layer Packet (TLP) prefix area of the PCI Express in the access request transmitted from the CPU using the PCI Express;
   when the destination identified at the identifying is another switch, transmitting the access request with the second identifier to the destination identified at the identifying; and
   when the destination identified at the identifying is the device, deleting the second identifier from the access request and transmitting the access request with no second identifier.

5. A communication control method comprising:
receiving, by an apparatus, an access request from a Central Processing Unit (CPU);
identifying, by the apparatus, a second identifier and a destination that are associated with a first identifier included in the access request with reference to a memory that stores therein the first identifier used by the CPU that accesses a device using Peripheral Component Interconnect (PCI) Express to identify the device, the second identifier that is a common identifier to identify the device in a network formed among a plurality of switches that connect the CPU to the device, and the destination of an access request to the device in an associated manner;
adding, by the apparatus, the identified second identifier to the access request, the adding writes the second identifier identified at the identifying in a Transaction Layer Packet (TLP) prefix area of the PCI Express in the access request transmitted from the CPU using the PCI Express;
when the destination identified at the identifying is another switch, transmitting, by the apparatus, the access request with the second identifier added to the identified destination; and
when the destination identified at the identifying is the device, deleting, by the apparatus, the second identifier from the access request and transmitting, by the apparatus, the access request with no second identifier.

\* \* \* \* \*